Sept. 12, 1961 J. L. KOVALCIK 2,999,684
CUTTING GAUGE FOR FRAME PARTS
Filed Feb. 4, 1959 4 Sheets-Sheet 1

INVENTOR.
JAMES L. KOVALCIK
BY Ely, Frye & Hamilton
ATTORNEYS

Sept. 12, 1961  J. L. KOVALCIK  2,999,684
CUTTING GAUGE FOR FRAME PARTS
Filed Feb. 4, 1959  4 Sheets-Sheet 2

INVENTOR.
JAMES L. KOVALCIK
BY *Ely, Frye & Hamilton*
ATTORNEYS

INVENTOR.
JAMES L. KOVALCIK
BY Ely, Frye & Hamilton
ATTORNEYS

Sept. 12, 1961
J. L. KOVALCIK
2,999,684
CUTTING GAUGE FOR FRAME PARTS
Filed Feb. 4, 1959
4 Sheets-Sheet 4
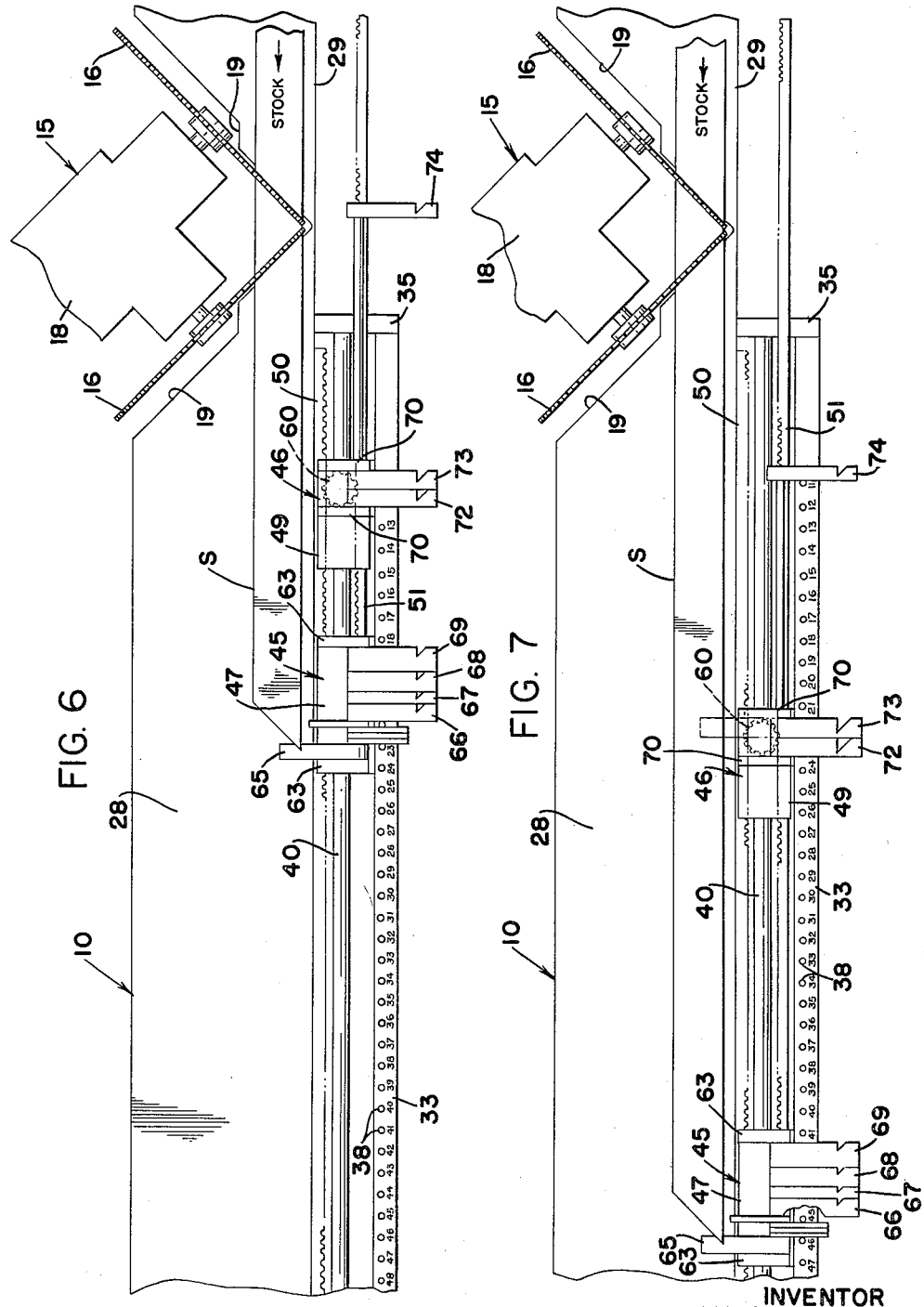
INVENTOR
JAMES L. KOVALCIK
BY Ely, Frye & Hamilton
ATTORNEYS United States Patent Office 2,999,684
Patented Sept. 12, 1961

2,999,684
CUTTING GAUGE FOR FRAME PARTS
James L. Kovalcik, 325 Elknud, Johnstown, Pa.
Filed Feb. 4, 1959, Ser. No. 791,224
3 Claims. (Cl. 269—192)

The invention relates generally to gauges for measuring material to predetermined lengths for cutting and more particularly to a cutting gauge for various storm window or door parts, whereby all of the members comprising the main frame, sash frames and screen frames can be quickly measured and cut to exact required lengths.

Certain conventional gauges for this purpose have had one or more stop bars movable along a graduated scale, so that a bar could be set on the desired graduation for each length of material required. Such gauges required a separate setting for each different length of material, multiplying the chance of error at each setting, and requiring excessive time to make a plurality of settings for a variety of lengths of frame members used in a storm window or door having frame, sash and screen members. Moreover, the height members of the ordinary window frame are substantially twice as long as the height members for the sash and screen, requiring widely different settings and additional chances of error.

The purpose of the present invention is to provide an improved gauge device requiring only one setting on the measuring scale for all the cross pieces of the window or door and one setting for all the height pieces.

Another object is to provide an improved gauge device having a main gauge unit comprising a plurality of preset stop bars for gauging the lengths of all the cross members, and a secondary gauge unit for cooperating with said main gauge unit to gauge the lengths of all the height members required.

A further object is to provide an improved gauge device having main and secondary gauge units mounted for relative movement along a measuring scale whereby movement of the main gauge unit automatically moves the secondary gauge unit a predetermined distance substantially less than the movement of the main gauge unit.

A still further object is to provide an improved gauge device having setting fingers cooperating with gauge pins on the measuring scale to set the gauge for desired lengths including fractional lengths.

These and other objects are accomplished by the improvements comprising the present invention, a preferred embodiment of which is shown by way of example in the accompanying drawings and described in detail herein. Various modifications and changes in details of construction are included within the scope of the invention defined in the appended claims forming part hereof.

Referring to the drawings:

FIG. 6 is a schematic plan view similar to FIG. 1, showing the main gauge unit positioned for cutting a length of stock for a cross member of the frame of a window.

FIG. 7 is a similar view showing the main gauge unit positioned for cutting a length of stock for a height member of the window frame, and showing in phantom lines one of the stops of the secondary gauge unit positioned for cutting a length of stock for a height member of one of the window sashes.

The elongated cut-off table indicated generally at 10 is supported between its ends on a hollow rectangular post or stanchion 11 resting on a base plate 12. The table is preferably supported on angles 13 welded to the sides of stanchion 11, and the top of the table may be secured to the stanchion by bracket plates 14. The outer ends of the table may be supported by suitable legs (not shown).

Figure 1:
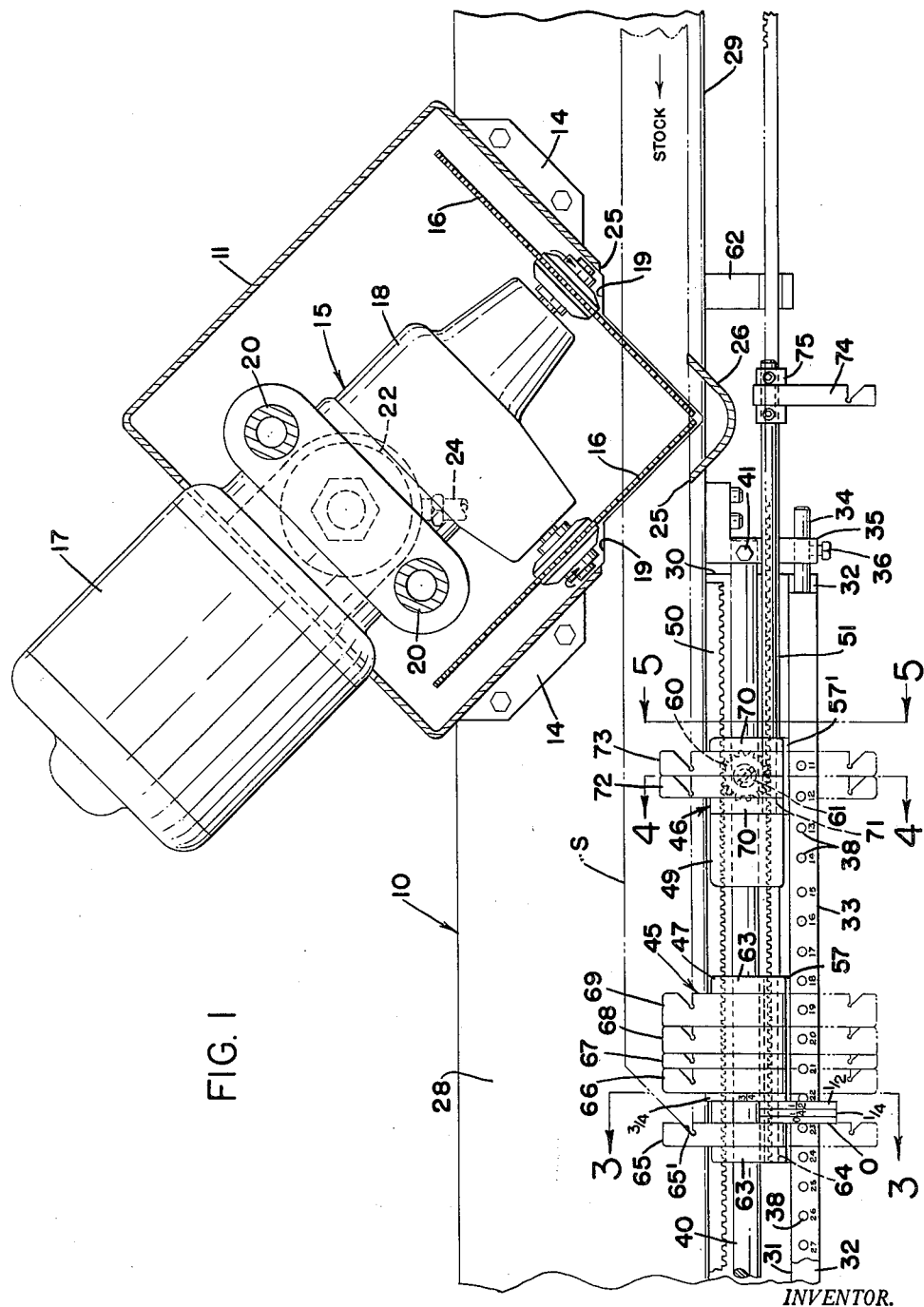
FIG. 1 is a plan view showing the improved gauge device mounted along a stock cutting table, a double-miter cut-off saw being shown above the table with its housing shown in section.

The stanchion 11 is positioned so that its diagonal is transverse of the length of the table, as shown in FIG. 1, and a double-miter rotary saw 15 is mounted within the stanchion housing above the table. The saw 15 has two rotary blades 16 at right angles to each other and at 45° to the length of the table 10 for making a double miter cut in a piece of stock placed lengthwise of the table. A motor 17 drives the blades 16 through suitable gearing in gear housing 18.

Figure 2:
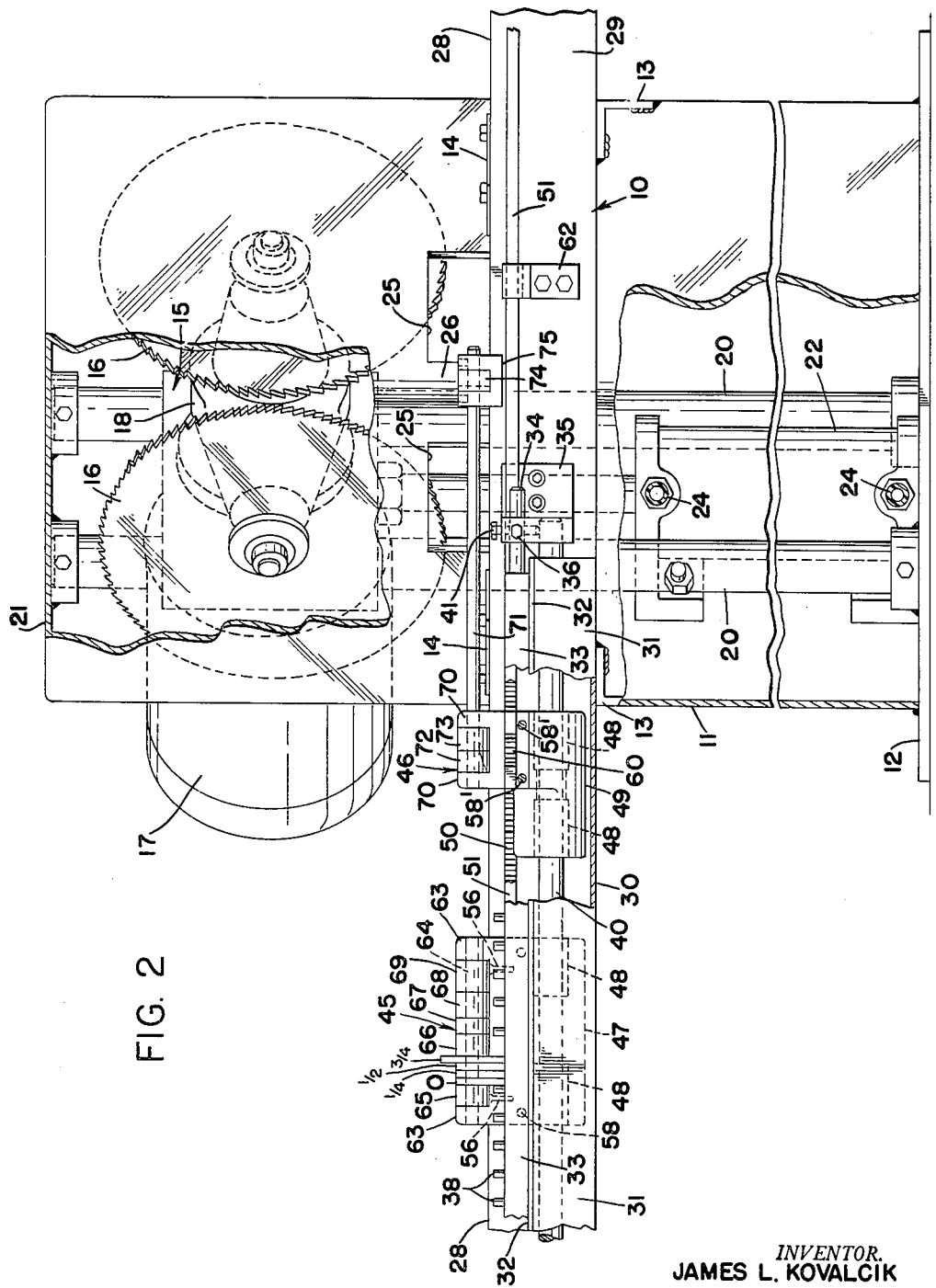
FIG. 2 is a front elevation of the cutting table, saw and gauge device, parts being broken away.

As best shown in FIGS. 6 and 7, the table 10 has a notched out V-shaped opening 19 around the saw blades 16. Referring to FIGS. 1 and 2, the saw assembly 15 is preferably mounted for vertical movement on two vertical guide rods 20 secured at their upper ends to the top plate 21 of the stanchion housing and at their bottom ends to the base plate 12. A fluid cylinder 22 resting on said base plate has its piston rod connected at its upper end to the central portion of the saw unit 15. The cylinder 22 has fluid pressure conduit connections 24 at its ends to admit and exhaust pressure fluid for raising and lowering the saw. A suitable four-way valve (not shown) may be provided to control flow to and from the cylinder.

The stanchion housing 11 is provided in its two forwardly facing side walls with rectangular openings 25 aligned longitudinally of the table to permit the passage therethrough of the stock S, as indicated in FIGS. 6 and 7 and in phantom lines in FIG. 1. The corner portion 26 between openings 25 cooperates with the gauge bars to align the stock longitudinally of the table in position to be cut by the saw blades 16.

Figure 3:
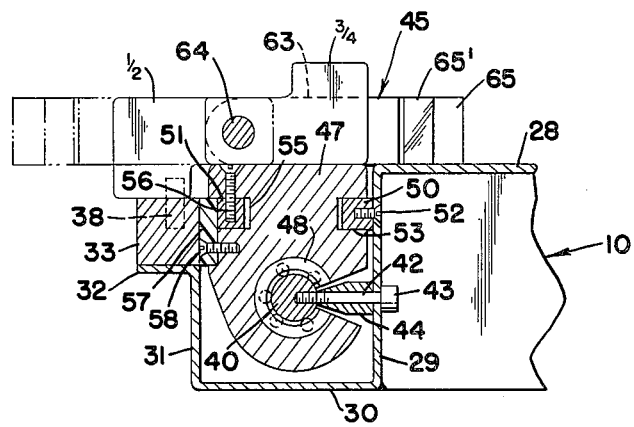
FIG. 3 is an enlarged transverse section through the main gauge unit, as on line 3—3 of FIG. 1.
Figure 4:
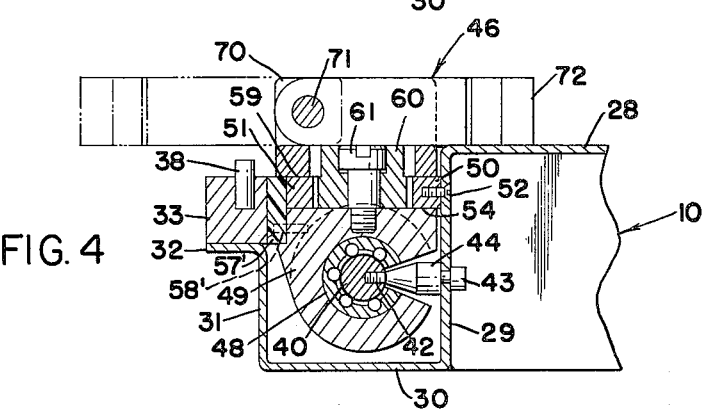
FIG. 4 is an enlarged transverse section through the secondary gauge unit, as on line 4—4 of FIG. 1.
Figure 5:
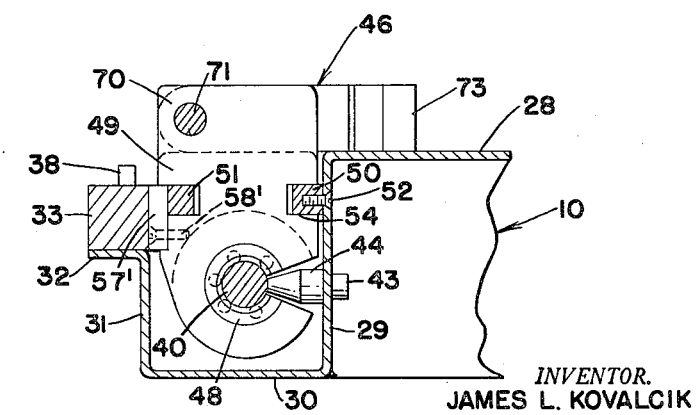
FIG. 5 is an enlarged transverse section on line 5—5 of FIG. 1, showing the secondary gauge unit in elevation.

The improved gauge device is supported along the front edge of the table. Preferably, as best shown in FIGS. 3, 4 and 5, the table top is a horizontal sheet metal wall 28 having a downturned front wall 29. A horizontal flange 30 extends forwardly from the bottom of wall 29 and a front flange 31 extends vertically from the front edge of flange 30. The flange 31 terminates opposite the vertically central portion of wall 29 and has a forwardly extending horizontal lip 32.

The wall 29 and flanges 30 and 31 form a trough extending along the front edge of the table from near the left side of the stanchion 11 to the outer left end (not shown) of the table. The gauge units travel in this trough and the graduated scale measuring bar 33 is supported on the lip 32. Preferably a rod 34 extends from the inner end of bar 33 through a bracket 35 mounted on the front wall 29 of the table. The rod 34 is adjustably secured in the bracket 35 by a set screw 36 to allow longitudinal adjustment of the measuring scale bar. Obviously, the table and measuring scale 33 will extend to the left of the saw 15 a distance at least equal to the longest piece of stock to be cut.

The measuring scale bar is graduated in inches throughout its length, and vertical stop pins 38 are positioned accurately on the bar, one at each inch mark. These pins cooperate with stop fingers on the gauge units to enable quick and accurate setting of the gauge units by abutment of the stop fingers with the stop pins, thus eliminating the chance of error in matching up marks or lines on the gauges with graduation marks on the scale.

The gauge units are slidably mounted on a guide shaft 40 extending longitudinally in the trough between wall 29 and flange 31. The inner end of the shaft 40 may be secured in bracket 35 by a set screw 41, and the outer end of the shaft may be secured in a similar bracket (not shown) on the outer end of the front wall 29 of the table. As shown in FIGS. 3, 4 and 5, the shaft 40 may be rigidly supported at intervals along its length by set screws 42 having their heads 43 abutting the rear side of wall 29, with tapered spacer bushings 44 around the screws between the wall 29 and shaft 40.

The main or primary gauge unit is indicated as a whole at 45 and a secondary gauge unit is indicated as a whole at 46. The main gauge unit 45 comprises a block 47 slidably mounted on shaft 40 by ball bearing bushings 48, and the secondary gauge unit 46 comprises a block 49 slidably mounted on shaft 40 by similar ball bearing bushings 48. Two laterally opposed gear rack bars extend longitudinally through the gauge blocks 47 and 49. The rear rack bar 50 is secured to the wall 29 and both blocks are slidable thereon. The front rack bar 51 is secured to block 47 and is slidable through block 49.

Referring to FIGS. 3, 4 and 5, rear rack bar 50 is preferably secured at intervals to wall 29 by screws 52, and is slidable in a longitudinal slot 53 in block 47 and a longitudinal slot 54 in block 49. Front rack bar 51 fits in a slot 55 in block 47, and is secured by screws 56 to block 47. A nylon bar 57 which serves as a bearing surface, along the rear face of measuring bar 33, is fastened to block 47 by screws 58. Bar 57 is the same length as block 47. Rack bar 51 is slidable through a slot 59 in block 49.

A pinion 60 is journaled on a stud 61 in block 49 and meshes with both rack bars 50 and 51. Thus, as the main gauge unit 45 is moved along guide shaft 40, it moves the front rack bar 51 with it and rotates pinion 60, which being also meshed with stationary rear rack bar 50 causes gauge unit 46 to move half the distance through which gauge unit 45 is moved. A nylon bar 57' is fastened to block 49 by screws 58'. The bar 57' is the same length as block 49 and acts as a bearing surface, similar to bar 57, sliding against the scale 33 and rack 51. This bar 57' also keeps rack 51 meshed with pinion 60. A supporting bracket 62 is mounted on the front of the table to support the inner end of rack bar 51 extending to the right of the saw in the position of FIG. 1.

The main gauge unit 45 has upwardly extending ears 63 at opposite ends, between which a pivot shaft 64 extends, and a plurality of gauge bars are pivoted on said shaft for selective positioning over the table 28 or in an out-of-the-way position substantially 180° therefrom, as indicated in phantom lines in FIG. 1. The first gauge bar 65 at the left end of the unit may be referred to as the master gauge bar, for it is used to gauge the stock pieces used for the height and width of the outer storm window or door frame. In FIG. 1, gauge bar 65 is set to gauge a frame width piece, and in FIG. 7 it is set to gauge a frame height piece. An inclined notch 65' is provided in the inner face of gauge bar 65 to receive the triangular point of the mitered edge of the stock S.

Four abutting drop fingers, each ¼" in width, are pivoted on shaft 64 against the inner face of gauge bar 65, and these fingers are marked 0, ¼, ½, and ¾, respectively, reading from the left. The remaining space to the right end ear 63 is occupied by a plurality of gauge bars similar to bar 65 pivoted on shaft 64, these gauge bars being designated 66, 67, 68 and 69, respectively. These bars gauge the pieces for the sash and screen widths of the storm window, and may be replaced by similar bars of different widths to suit different size windows. These bars also have inclined miter notches similar to the notch 65'.

The secondary gauge unit 46 is used for gauging stock pieces used for the height of the sash and screen frames. The block 49 has upwardly extending longitudinally spaced ears 70, between which a pivot shaft 71 extends, and two abutting gauge bars 72 and 73 are pivoted on said shaft for selectively positioning over the table 28 or 180° therefrom. The pivot shaft 71 may extend a substantial distance to the right of gauge unit 46, and is provided with an additional gauge bar 74 pivoted on its inner end in a bracket 75 adjustably secured to the shaft. This bar 74 is used to gauge pieces for special sash heights.

In the operation of the gauge device for cutting stock pieces for a storm window of predetermined dimensions, the relative widths of gauge bars 66–69 being such as to gauge the cross pieces for the sashes and screen frame, the bars 66–69 and 72–74 are rotated to their out-of-the-way positions as shown in FIG. 6. If the frame cross pieces are to be 23" long, for example, the "0" drop finger is moved into abutment with pin No. 23, and the ¼ and ½ drop fingers dropped between the No. 23 and No. 22 pins to lock the gauge in position, as shown in FIGS. 1 and 6. If the frame cross piece were to be 23¼" long, the "0" drop finger would be raised and the ¼ finger moved against pin No. 23 with the ½ and ¾ dropped to lock the gauge in position.

As shown in FIG. 6, a length of the stock S, which is preferably extruded aluminum of a desired cross section, is passed through the openings 25 of the saw housing, the saws being in raised position. The leading end of the stock S having been mitered by the previous operation, its point is inserted in the notch 65' in gauge bar 65. The stock is now gauged for cutting off a 23" piece, and the saw 15 is lowered and operated to make a double-mitered cut through the stock and two 23" pieces cut and removed. Next the gauge bars 66–69 are rotated successively over the table and the stock advanced into contact with them, whereupon slightly shorter lengths may be cut for the cross bars of the sashes and screens.

After all the cross pieces have been cut, the main gauge unit 45 is advanced along the scale to a position opposite the required stop pin 38 for gauging the pieces used for the height of the window frame. For example, if the frame height pieces are to be 46" long, the "0," ¼ and ½ drop fingers are dropped between pin No. 46 and pin No. 45. Then with gauge bar 65 over the table and gauge bars 66–69 out of the way, the stock is advanced to contact bar 65, as shown in FIG. 7, and two height pieces for the sides of the frame are cut.

When the main gauge unit 45 is advanced from pin No. 23 to a position opposite stop pin No. 46, the secondary gauge unit is automatically advanced half that distance in the manner previously described, or in other words from a position opposite pin No. 11 to opposite a point between pins Nos. 22 and 23. One or the other of stops 72 and 73 is then rotated over the table to gauge the exact lengths of height pieces for the two sashes of a double sash storm window, as indicated in phantom lines in FIG. 7. By providing additional gearing in gauge unit 46, the distance it moves can be made some other desired fraction of the distance moved by the main gauge 45, for example one-third for a triple sash window.

The improved gauge device provides for cutting all of the required frame pieces for a storm window or door with only two settings, one for height pieces and one for width pieces, thus reducing errors and effecting a substantial saving in time. The settings are made by dropping fingers between stop pins rather than by setting to graduations on a scale, thereby further reducing errors and saving time. The gauge is easily adapted for windows and doors having different sizes of sashes or screens, by replacing the several gauge bars with those of required dimensions.

What is claimed is:

1. In combination with a table, a cutting gauge for measuring frame pieces of material for a storm window or door comprising, a graduated scale bar mounted longitudinally of said table, a main gauge block mounted on said table for movement along said scale bar, a master gauge bar rotatably mounted on said block for movement over said table, cooperating means on said main gauge block and said scale bar to position and lock said gauge block, a secondary gauge block mounted for movement along said scale bar, a gauge bar rotatably mounted on said secondary block for movement over said table, a stationary longitudinal rack bar on said table, a laterally spaced rack bar carried by said main gauge block, and a pinion on said secondary gauge block meshing with both said rack bars, whereby movement of said main block will cause a predetermined fractional movement of said secondary block in the same direction.

2. In combination with a table, a cutting gauge for measuring frame pieces of material for a storm window or door comprising, a graduated scale bar mounted longitudinally of said table and having stop pins at the graduations, a main gauge block mounted on said table for movement along said scale bar, a master gauge bar rotatably mounted on said block for movement over said table, drop fingers rotatably mounted on said main gauge block and adapted to be moved between adjacent stop pins to position and lock said gauge block, a secondary gauge block mounted for movement along said scale bar, a gauge bar rotatably mounted on said secondary block for movement over said table, a stationary longitudinal rack bar on said table, a laterally spaced rack bar carried by said main gauge block, and a pinion on said secondary gauge block meshing with both said rack bars, whereby movement of said main block will cause a predetermined fractional movement of said secondary block in the same direction.

3. In combination with a table, a cutting gauge for measuring frame pieces of material for a storm window or door comprising, a graduated scale bar mounted longitudinally of said table and having stop pins at the graduations, a main gauge block mounted on said table for movement along said scale bar, a master gauge bar rotatably mounted on said block for movement over said table, additional gauge bars rotatably mounted on said main gauge block in abutment with said master gauge bar and having width proportionate to the lengths of additional pieces being cut, drop fingers rotatably mounted on said main gauge block and adapted to be moved between adjacent stop pins to position and lock said gauge block, a secondary gauge block mounted for movement along said scale bar, a gauge bar rotatably mounted on said secondary block for movement over said table, a stationary longitudinal rack bar on said table, a laterally spaced rack bar carried by said main gauge block, and a pinion on said secondary gauge block meshing with both said rack bars, whereby movement of said main block will cause a predetermined fractional movement of said secondary block in the same direction.

References Cited in the file of this patent

UNITED STATES PATENTS

| | | |
|---|---|---|
| 977,474 | Read et al. | Dec. 6, 1910 |
| 2,273,249 | Cervenka | Feb. 17, 1942 |
| 2,498,865 | Snow | Feb. 28, 1950 |
| 2,576,340 | Hammond | Nov. 27, 1951 |
| 2,722,731 | Le Tarte | Nov. 8, 1955 |
| 2,791,823 | Espari et al. | May 14, 1957 |
| 2,852,049 | Peterson | Sept. 16, 1958 |